J. HARTMAN.
VEHICLE BRAKE.
APPLICATION FILED JUNE 3, 1913.
1,142,880.
Patented June 15, 1915.
2 SHEETS—SHEET 1.
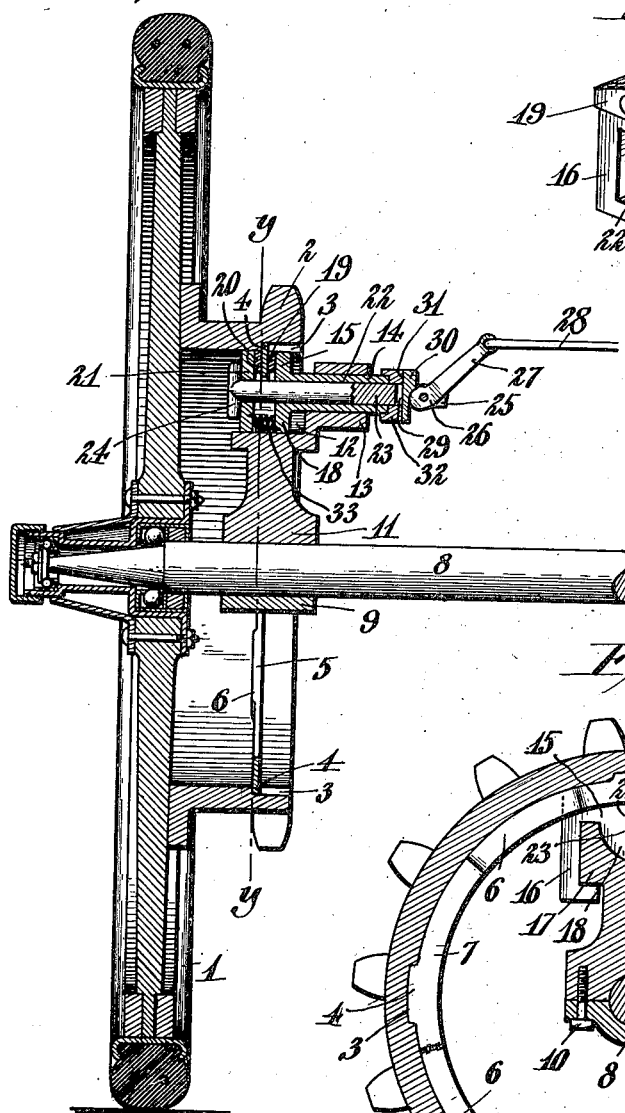
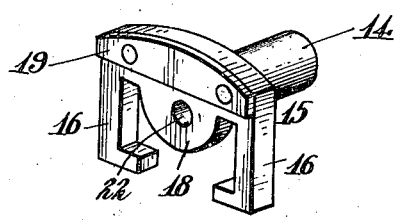
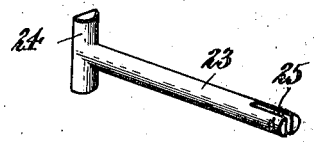
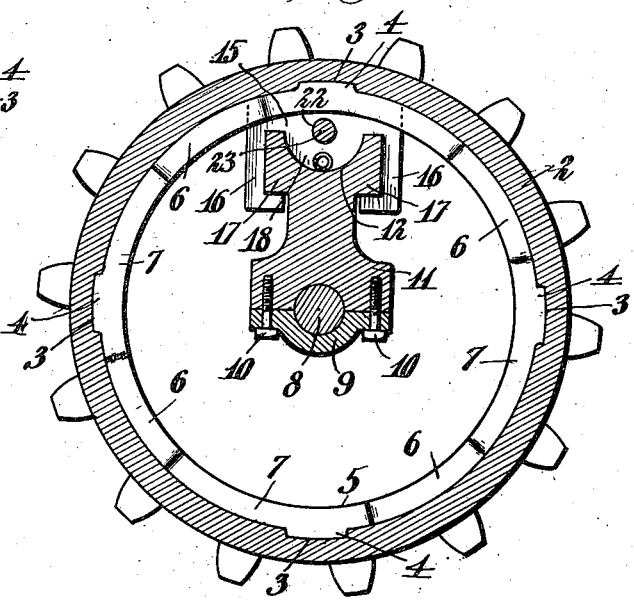
Witnesses:
Jacob Oberst Jr.
Eda M. Schweiger
John Hartman, Inventor.
By Emil Neuhart
Attorney.

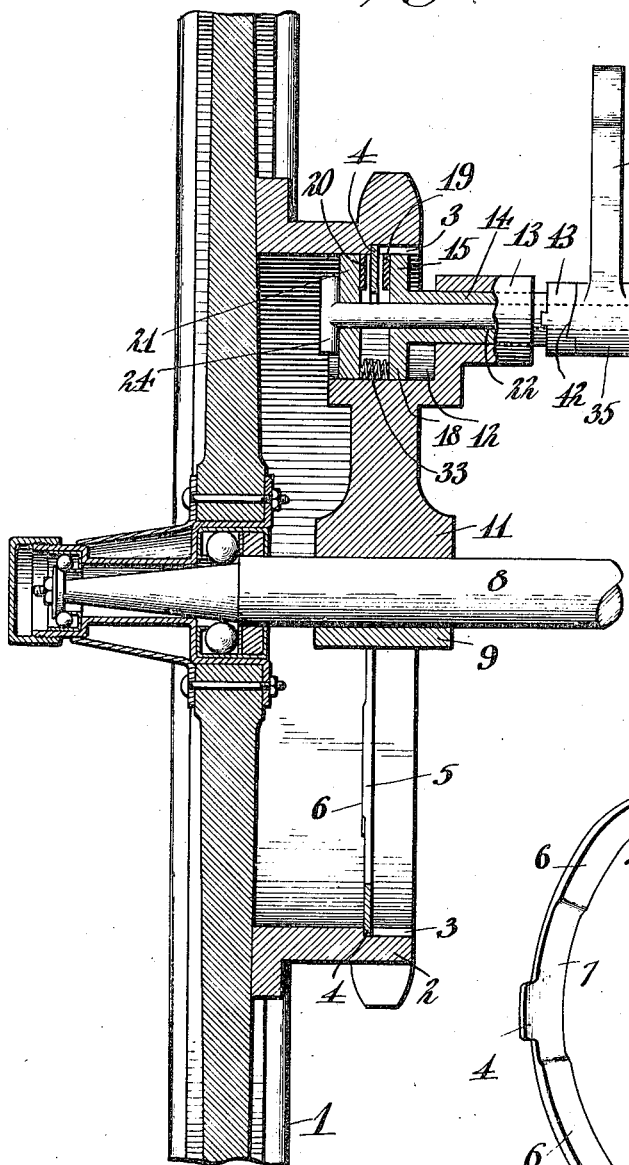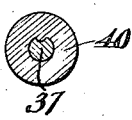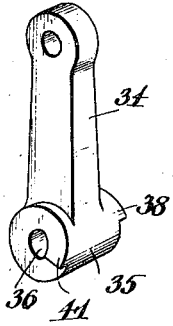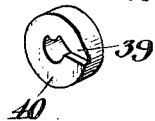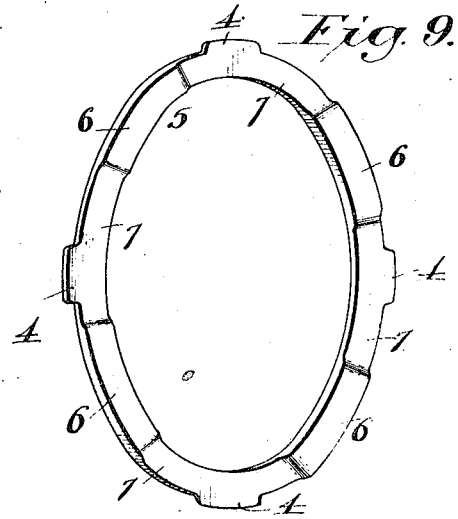

UNITED STATES PATENT OFFICE.

JOHN HARTMAN, OF BUFFALO, NEW YORK.

VEHICLE-BRAKE.

1,142,880.  Specification of Letters Patent.  Patented June 15, 1915.

Application filed June 3, 1913. Serial No. 771,374.

*To all whom it may concern:*

Be it known that I, JOHN HARTMAN, a citizen of the United States, residing at Buffalo, in the county of Erie and State of New York, have invented certain new and useful Improvements in Vehicle-Brakes, of which the following is a specification.

My invention relates to improvements in vehicle brakes, and is particularly designed for use as a motor or automobile brake, the main object of the invention being the production of a brake which will comprise few parts to insure simplicity and inexpensiveness of manufacture; which will not be likely to get out of order; which will be thoroughly reliable in operation and which in general will prove thoroughly efficient and practical.

With these objects in view, the invention may be said to consist broadly in the combination with the driving sprocket of a motor vehicle, of a brake band carried by said wheel, and means manually operated to bear upon said band and effect the braking of the driving sprocket.

The invention further consists of a motor vehicle brake embodying novel features of construction and arrangement of parts for service as will hereinafter appear.

In order, that the detailed construction of my brake and its operation may be fully understood, I have shown in accompanying drawings two constructions of my invention and I would state that many changes in the details of my improvements may be made without departing from my invention.

Figure 1 is a vertical sectional view of the central portion of one of the wheels, the driving sprocket-wheel and my brake mechanism. Fig. 2 is a perspective view on an enlarged scale of the guiding shoe and one of the brake members. Fig. 3 is a perspective view of the actuating device or bolt. Fig. 4 is a sectional view on line *y—y*, of Fig. 1. Fig. 5 is a vertical sectional view of a modified form of my invention. Fig. 6 is a section on line *z—z*, of Fig. 5. Fig. 7 is a perspective view of the rock arm having the cam to operate the brake devices. Fig. 8 is a perspective view of one of the cam rings operating in conjunction with the cams of the rock arm, and Fig. 9 is a perspective view of the brake band or ring removed from the sprocket-wheel.

Referring by numerals to the drawings in which similar numerals denote corresponding parts in all the views: The numeral 1 designates one of the rear or driving wheels of a motor vehicle, on the inner face of which is secured a cupped driving sprocket-wheel 2, which is formed at certain points upon the interior of its rim with a series of seats or recesses 3 to receive lugs 4 extending from the periphery of a band or rim 5, which I term the brake band, and this band has its outer face formed with a series of raised flat faces 6 which with the contiguous depressed portions 7 of the band form a waving or undulating braking surface. It will thus be seen that the brake band fits and is retained in the sprocket-wheel and revolves with the wheel under normal conditions. Upon the axle 8 and within the driving-wheel is mounted by means of the bearing plate 9 and bolts 10, the vertical bracket 11, which is formed at its upper end on its outer face with a curved chamber or cavity 12, and at its inner face is provided with an extension or sleeve 13. In this sleeve 13 is slidingly mounted the hollow stud 14, of what I call the guiding or brake shoe 15, said shoe being formed with a pair of angular guide arms 16 which engage the shoulders 17 of the bracket, as seen in Fig. 4. This shoe is further provided with a guiding lug 18 which fits and moves in the curved cavity 12, and the face of the shoe carries the fiber or other brake pad 19. From this construction it will be noted that the bracket remains stationary in a vertical position while the wheel and driving sprocket revolve with the brake band and that the shoe has a sliding movement with reference to the brake band and is capable of bringing its brake pad against one face of the band. 20 designates a second or companion pad and in order to bring the same against the other face of said brake band, I form the plate 21 which carries said pad 20, with an opening 22. Through this opening passes a pin or bolt 23, having at its outer end a head or enlargement 24 to engage plate 21, and said pin or bolt passes also through the sleeve of the shoe 15 and at its inner end 25 is forked or bifurcated. In the bifurcated end of the bolt 23 is pivoted the lower cam-shape end 26 of a rock arm 27, to whose upper end is connected a rod 28 leading to the brake operating lever, (not shown) and in the space 29 formed between the inner end of the bifurcation and the cam-shape end of arm 27 is placed a wedge 30, whose vertical face 31 rests against a cap 32 which fits onto the bolt 23 and bears against the adjacent end of the hollow stud 14.

In operation the brake band revolves freely under normal conditions, a spring 33 being interposed between shoe 15 and plate 21 to hold the pads 19 and 20 out of contact with the brake band, and when it becomes necessary to apply the brake, the operating lever is actuated to depress the rock arm 27 which brings the cam thereof against wedge 30 and moves the brake shoe 15 with its pad outward and the bolt 23 with its pad inward against opposite faces of the brake band, instantly retarding the revolution of the sprocket. At once, upon release of the operating lever, spring 33 moves the pads away from the brake band and the rock arm returns to normal position.

In the modified construction of my invention, the operation is precisely the same as in the construction described, only that the rock arm 34 has a head 35 at its lower end provided with an opening 36 to fit onto the pin or bolt 37, said head being provided on one face with a cam 38 riding upon a cam 39 of a ring 40, and upon its other face with a cam 41 riding upon the cam face 42 of a ring 43. The cam faces of said ring and head are of wedging or inclined form and arranged as shown, in order that when the arm is depressed it spreads the rings apart bringing one of the pads against one face of the brake band and the other pad against the other face thereof in exactly the same manner as in the other form of my invention.

It will be apparent that I provide a brake which is under perfect control of the driver of the machine and that it is positive and reliable in action and will withstand hard usage, and not be subject to any great amount of wear and can at a small expense be applied to any motor vehicle. Moreover, by the peculiar construction of the brake bands, slipping of the brake member is entirely eliminated.

Having thus described my invention, what I claim is,—

1. In a vehicle brake, the combination of a driving sprocket provided with recesses or seats, a brake band having peripheral ears to fit in said seats to retain the band in place, and braking mechanism adapted to simultaneously engage both faces of said brake band.

2. In a vehicle brake, the combination of a driving sprocket provided with recesses or seats, a brake band having ears to fit in said seats to retain the band in place, and braking mechanism adapted to simultaneously engage both faces of said band, said band having a flat face and a face formed with raised portions.

3. In a vehicle brake, the combination with an axle, a wheel and a driving sprocket, of a brake band mounted in said sprocket, a bracket supported upon said axle, and brake mechanism mounted in said bracket and adapted to engage both faces of said brake band.

4. In a vehicle brake, the combination with an axle, a wheel rotatable on said axle, a sprocket secured to said wheel and a brake band secured to said sprocket, of a bracket mounted upon said axle, a shoe carried by said bracket and having sliding movement, a bolt having a sliding movement in the shoe, and means for moving said shoe and bolt toward each other to engage each face of said brake band.

5. In a vehicle brake, the combination of an axle, a wheel mounted thereon, a sprocket secured to said wheel and a brake band secured to said sprocket, of mechanism supported upon the axle and constructed to bear upon each face of said brake band to form a brake.

6. In a vehicle brake, the combination of an axle, a wheel mounted thereon, a driving sprocket secured to said wheel and a brake band secured to said driving sprocket, of a bracket upon said axle, a sliding shoe mounted in said bracket and carrying a brake-pad arranged upon one side of said brake band, a brake-pad disposed on the opposite side of said brake band, a sliding bolt mounted in said shoe and adapted to actuate said last-mentioned pad, means for holding said pads out of contact with said brake band, and means for bringing said pads against both faces of said brake band.

7. In a vehicle brake, the combination of an axle, a wheel mounted thereon, a driving sprocket secured to said wheel and a brake band secured to said driving sprocket, of a bracket upon said axle, a sliding shoe mounted in said bracket and carrying a brake-pad arranged upon one side of said brake band, a brake-pad disposed on the opposite side of the brake band, a sliding bolt mounted in said shoe and adapted to actuate said last-mentioned pad, means for holding said pads out of contact with the brake band, and means for bringing said pads against both faces of said brake band, said last-mentioned means consisting of a cam device for moving said shoe and bolt with their brake-pads in unison against the two faces of said brake band.

In testimony whereof, I have affixed my signature in the presence of two subscribing witnesses.

JOHN HARTMAN.

Witnesses:
EMIL NEUHART,
JACOB OBERST, Jr.